United States Patent [19]
Kossuth
[11] Patent Number: 4,631,097
[45] Date of Patent: Dec. 23, 1986

[54] EMBOSSED GYPSUM BOARD

[75] Inventor: Donald A. Kossuth, Buffalo, N.Y.
[73] Assignee: National Gypsum Company, Dallas, Tex.

[21] Appl. No.: 356,977
[22] Filed: Mar. 11, 1982
[51] Int. Cl.[4] ........ B32B 31/12
[52] U.S. Cl. ........ 156/44; 156/183; 156/209; 428/172; 428/537.5; 428/703
[58] Field of Search ........ 428/703, 167, 172, 537.5; 156/44, 219, 83, 183, 209

[56] References Cited

U.S. PATENT DOCUMENTS

| | | | |
|---|---|---|---|
| 1,497,261 | 6/1924 | Emerson | 428/703 |
| 2,681,377 | 6/1957 | Smithers | 428/167 |
| 3,449,482 | 6/1967 | Mitchell et al. | 428/167 |
| 3,630,817 | 12/1971 | Winkowshi | 428/703 |
| 3,692,620 | 9/1972 | Schmidt et al. | 428/703 |
| 3,694,298 | 9/1972 | Veschuroff | 156/219 |
| 3,935,358 | 1/1976 | Wyeht et al. | 428/167 |
| 4,310,370 | 1/1982 | Arai et al. | 428/703 |

*Primary Examiner*—George F. Lesmes
*Assistant Examiner*—P. R. Schwartz
*Attorney, Agent, or Firm*—Robert F. Hause

[57] ABSTRACT

Predecorated gypsum board having an embossed design extending into the paper-covered front face and a utilitarian embossing extending into the paper-covered back face, preferably formed by embossing a laterally extending crepe design in the back paper with longitudinally extending narrow relatively unembossed strips at spaced positions across the width of the paper.

1 Claim, 5 Drawing Figures

EMBOSSED GYPSUM BOARD

This invention relates to embossed gypsum wallboard and particularly to gypsum board having a decorative embossed front paper cover sheet and a utilitarian embossed back paper cover sheet.

Canadian Pat. No. 943,848 describes a method of making predecorated gypsum wallboard wherein a web of wallboard face paper is first embossed, and then a gypsum wallboard is formed with the embossed paper forming the face of the wallboard, and a back paper forms the back face of the wallboard. A potential problem in this type of board is said to reside in the possibility of the front paper and back paper not being balanced. The solution to this problem, taught by the Canadian patent, is to make the weakened embossed paper a heavier and stronger paper to start, or "by using similarly embossed papers on both the back face and the front face". The Canadian patent proceeds to teach that with sharp or deep embossments "similar front and back papers are the only solution".

The present invention provides an improved solution to the problem discussed in the Canadian patent, even when embossments are sharp or deep.

Gypsum wallboard, for use in drywall construction, has commonly had a better grade of paper on the front face than on the back face. Commonly a cream face paper is used on the front and a less expensive grey back paper is used on the back. Predecorated gypsum board having an embossed design in the front face paper has also been found to require a better and more expensive grade of paper for the embossed face than is typically used on the back face of unembossed wallboards, even including in the former case the cost of embossing.

In accordance with the present invention, a gypsum wallboard is formed using an embossed paper on the front face and an embossed paper on the back face, with a distinctly different grade of paper being used for the embossed back paper compared to the embossed front paper. Preferably the embossing on the back paper has what may be best defined as a utilitarian design, as opposed to a decorative design, suitable for balancing the front and back of embossed wallboards of many varied front face decorative embossing designs. A very suitable utilitarian design for the back paper consists of a lightly creped paper embossing, with a lateral crepe extent and preferably a plurality of longitudinally extending narrow relatively unembossed strips at spaced positions across the width of the paper.

It is an object of the invention to provide a novel balanced embossed paper-covered gypsum wallboard.

It is a further object to provide, in a gypsum wallboard with an embossed front paper, an embossed back paper of substantially lower cost than the front paper.

It is a still further object, in such wallboards, to provide an embossed paper for the back face having a simplified, common utilitarian emboss design, suitable for use in combination with various front face paper embossing designs.

These and other objects and advantages of the invention will be more apparent when considered in connection with the following detailed description of the preferred embodiments of the invention and the accompanying drawings in which.

Figure 1:
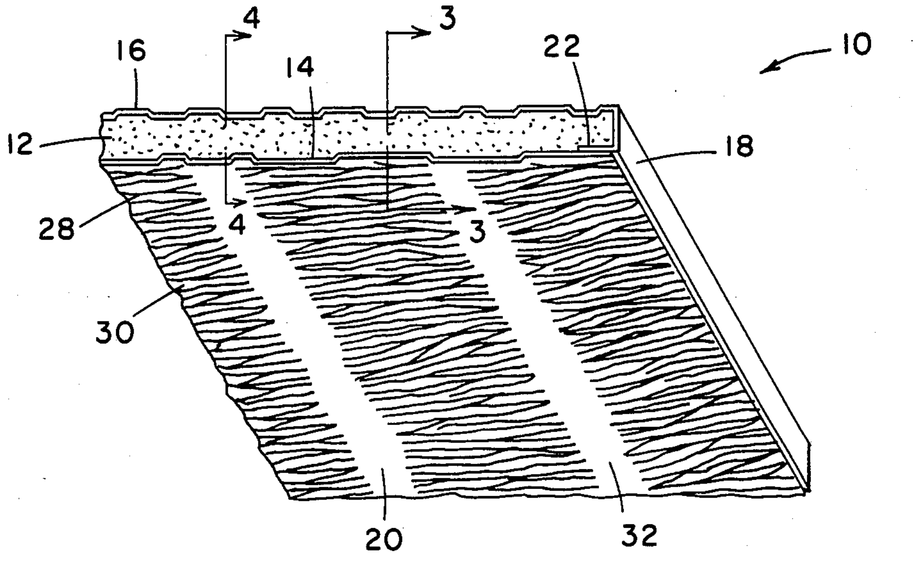
FIG. 1 is an isometric view of the end, side and back of a paper-covered gypsum board embodying the present invention.

Referring to FIGS. 1-4, there is shown a predecorated wallboard 10. Wallboard 10 has a set gypsum core 12, enclosed within a back paper 14 and a front paper 16. Front paper 16 extends around the wallboard side edge 18 and onto the back surface 20 of the board 10, whereat it is overlapped by the back paper 14, at lap 22.

The front paper 16 is formed with a plurality of wrinkles or embossments 24 of varied forms, substantially uniformly distributed throughout that portion disposed on the front face 26 of wallboard 10. The embossments 24 may take any of many possible forms, including pebbles, burlap, random wrinkles, squares, woodgrain, common wall textures designs, or other random geometric or natural occurring objects.

In the preferred form of the invention, the paper to be used to form front paper 16 is passed between embossing rolls which press embossments 24 into the previously flat paper web, just prior to forming the gypsum core on the inner side of the paper 16, however the embossing may be done long prior to use in gypsum board manufacture, including at the time of manufacturing the paper. Depending on the sharpness desired in the appearance of the embossments, matched embossing rolls will provide sharpest embossments and one embossing roll matched with a firm rubber backing roll will produce more subdued embossments.

In accordance with the invention, the paper to be used to form back paper 14 is also passed between matched embossing rolls which press embossments 28 into the previously flat paper web, preferably just prior to forming the gypsum core on the inner side of the paper 14. The embossments 28 on back paper 14 have a shape, size and arrangement based on utilitarian requirements, as opposed to a decorative design and particularly as opposed to the decorative requirements defining the shape, size and arrangement of embossments 24 in front paper 16.

Figure 2:
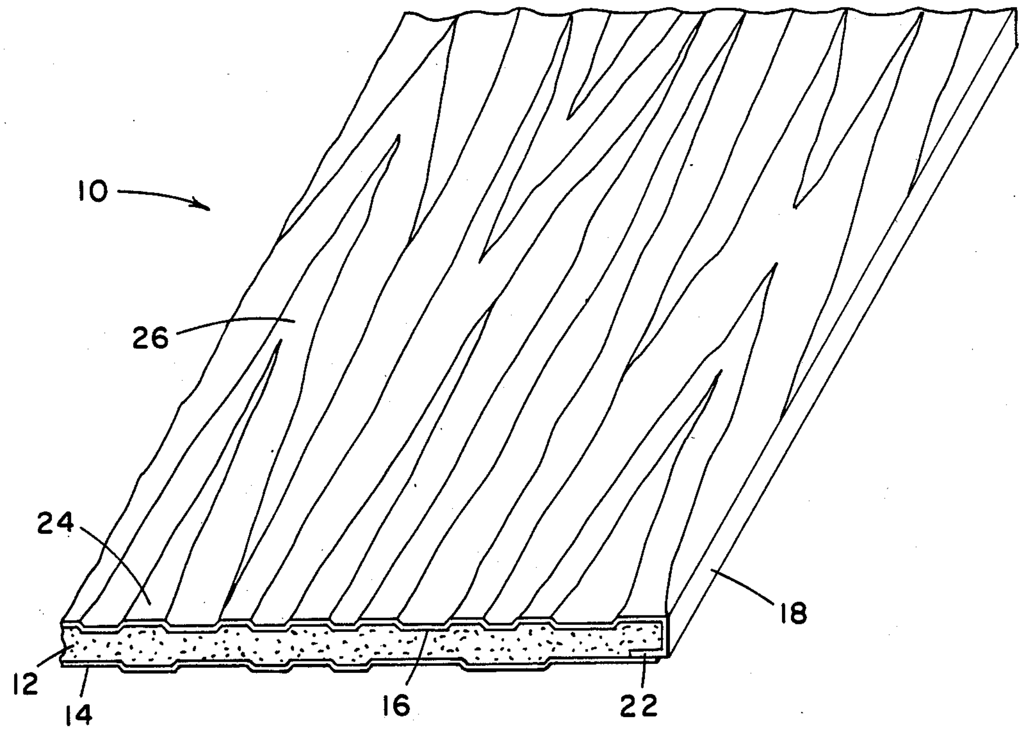
FIG. 2 is an isometric view of the end, side and front of the gypsum board of FIG. 1.
Figure 3:
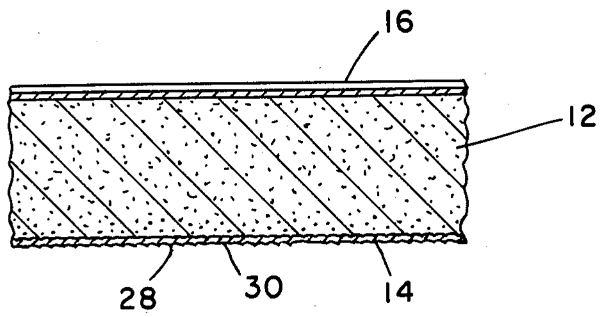
FIG. 3 is a cross-sectional view of the gypsum board of FIG. 1 taken on line 3—3.
Figure 4:
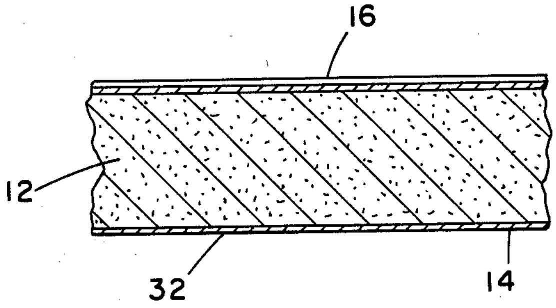
FIG. 4 is a cross-sectional view of the gypsum board of FIG. 1 taken on line 4—4.

As will be apparent from the above descriptions and as shown particularly clearly in FIGS. 1 to 3, the embossing of both the front paper and the back paper produces embossments 24 and 28, which in each case are areas of the front paper or the back paper which are located in a different plane from the balance of the paper. As will also be very apparent from FIGS. 1 to 3, the thickness of the front paper in embossments 24 is substantially the same as the thickness of the balance of the front paper and the thickness of the back paper in embossments 28 is substantially the same as the thickness of the balance of the back paper, whereby it can be said that both the front paper and the back paper are each respectively of substantially uniform thickness throughout.

In a preferred form of the invention, the embossed back paper 14 has elongated embossments 28, all extending laterally of the approximately four foot wide paper 14. The arrangement or design of the embossments may be described as a crepe paper design, with the elongated narrow embossments having always a basically lateral extent, but often varying from a true lateral extent by about 5° in either direction, whereby some embossments join other embossments considering the pattern from one side of the paper, or, reversing the paper, some embossments become terminated by the joining of adjacent valleys 30, the valleys 30 of one side being the embossments 28 of the paper opposite side.

The embossments 28, formed in a basically 0.02 inch thick back paper, have an average maximum height of 0.02 inch and a width such that, on either of the two respective sides of the paper, there are on the average about sixteen embossments 28 and sixteen valleys 30 per longitudinal inch of the approximately four foot wide and eight or more foot long back paper 14.

In a preferred form of the invention, the embossed back paper 14 has a plurality of narrow elongate continuous smooth stripes 32. Stripes 32 are formed by removing all metal to the full depth of the emboss design from one of two emboss rolls along a plurality of spaced parallel narrow elongate circumferential areas.

Figure 5:
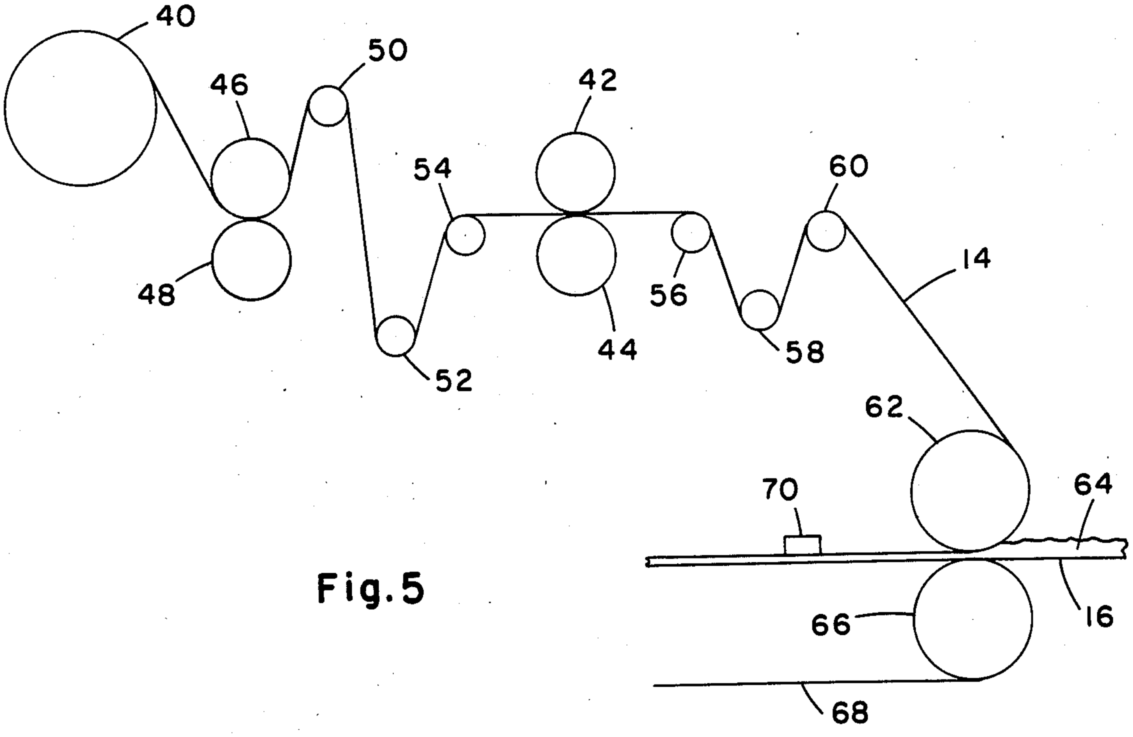
FIG. 5 is a diagrammatic sketch of certain of the apparatus used for making gypsum board in accordance with the invention.

Referring to FIG. 5, apparatus is diagrammatically shown, wherein the back paper 14 is embossed, or crimped, by passing an elongate web of paper, from supply roll 40, between two mated steel emboss rolls, 42, 44, or crimper rolls, with the rolls set as tight as possible, with about 700 pounds per lineal inch pressure forcing the rolls together.

The embossing, or crimping, of the back paper 14 should result in decreasing the length of the paper. In a preferred form, the paper is shortened about a tenth of an inch each foot or, preferably, less than 1%.

The paper to be used in forming embossed paper 14 is driven from the supply roll 40 by drive rolls 46, 48, around dancer rolls 50, 52, 54, which maintain uniform tension, and into the nip of emboss rolls 42, 44. From there, the embossed paper 14 is passed around another set of dancer rolls 56, 58, 60, and then under the top gypsum wallboard master roll 62, whereat a gypsum slurry is disposed and formed with a flat sheet consisting of gypsum slurry 64 back paper 14 and front paper 16. After this combination of gypsum 64 and paper cover sheet 14, 16 have been formed into board form by top master roll 62 and a bottom master roll 66, the unset, but formed, continuous web of formed gypsum board progresses along a conveyor 68.

An elongate aluminum bar 70 is disposed lightly atop the formed unset board as it starts to move away from the master rolls 62, 66. Bar 70 tends to provide additional leveling of the unset board top surface. Bar 70 is about 3 inches by ½ inch by over four feet, with each end being lightly supported in a way such that the length of the bar across the advancing newly formed web of board also is supported by the back paper 14.

The formed web of board is conveyed on conveyor 68 for a considerable distance, such that the gypsum has time to undergo an initial set. The web is then cut into 8 foot or longer lengths, flipped over, and then passed through a dryer. As the board passes through the dryer, it will commonly be supported by a plurality of rollers.

If the front and back papers 14, 16 of the embossed board passing through the dryer on rollers were not balanced, such as in accordance with the present invention, the ends of the boards would sag, such sag extending inward about a foot from each end, and having a sag of about one inch at the ends. This would be due to the tendency of the back paper to shrink, on drying. This tendency to shrink is avoided by the embossed or crimped back paper 14.

This ability to avoid shrinkage and sagging functions in a markedly more uniform manner, with variations in the elements of the board, by the provision of the plurality of unembossed stripes 32, which give a certain resistance to the paper 14 being stretched and the embossing decreased during the forming, at which time the paper 14 is under tension.

Having completed a detailed disclosure of the preferred embodiments of my invention, so that others may practice the same, I contemplate that variations may be made without departing from the essence of the invention or the scope of the appended claims.

I claim:

1. The method of making predecorated gypsum wallboard comprising the steps of forming a decorative embossed pattern in a web of substantially uniform thickness wallboard face paper, forming a utilitarian embossed pattern, as opposed to a decorative design, in a web of substantially uniform thickness wallboard back paper, said utilitarian embossed back paper being of substantially lower quality paper than the quality of said face paper, and forming a gypsum wallboard with said embossed face paper and said embossed back paper forming respectively the front face and the back side of said wallboard, with a core of gypsum therebetween, said forming step further including the step wherein said back paper is disposed on top of a slurry of settable gypsum during forming of said wallboard, and an elongate lightweight straight bar is disposed on said back paper, extending thereacross, as formed board is continuously moved outward from forming means.

* * * * *